United States Patent
Goldbart et al.

(10) Patent No.: US 11,831,012 B2
(45) Date of Patent: Nov. 28, 2023

(54) PASSIVATED SILICON-BASED ANODE MATERIAL PARTICLES

(71) Applicant: StoreDot Ltd., Herzeliya (IL)

(72) Inventors: Ohad Goldbart, Yehud (IL); Nitzan Shadmi, Tel Aviv (IL); Hani Farran, Givataim (IL); Daniel Aronov, Netanya (IL)

(73) Assignee: STOREDOT LTD., Herzeliya (IL)

(*) Notice: Subject to any disclaimer, the term of this patent is extended or adjusted under 35 U.S.C. 154(b) by 154 days.

(21) Appl. No.: 16/394,112

(22) Filed: Apr. 25, 2019

(65) Prior Publication Data
US 2020/0343543 A1    Oct. 29, 2020

(51) Int. Cl.
*H01M 4/38* (2006.01)
*H01M 10/0525* (2010.01)
(Continued)

(52) U.S. Cl.
CPC ........... *H01M 4/386* (2013.01); *H01M 4/136* (2013.01); *H01M 4/1397* (2013.01);
(Continued)

(58) Field of Classification Search
CPC . Y02E 60/10; H01M 2004/028; H01M 4/136; H01M 4/623; H01M 4/364;
(Continued)

(56) References Cited

U.S. PATENT DOCUMENTS

| 3,778,254 A | 12/1973 | Cole et al. |
| 6,051,340 A | 4/2000 | Kawakami |

(Continued)

FOREIGN PATENT DOCUMENTS

| CA | 2161076 | 4/1996 |
| CA | 2258026 | 12/1997 |

(Continued)

OTHER PUBLICATIONS

US 10,312,504 B2, 06/2019, Burshtain et al. (withdrawn)
(Continued)

*Primary Examiner* — Jonathan G Jelsma
*Assistant Examiner* — Omar M Kekia
(74) *Attorney, Agent, or Firm* — Reches Patents

(57) ABSTRACT

Methods, anode material particles, mixtures, anodes and lithium-ion batteries are provided, having passivated silicon-based particles that enable processing in oxidizing environments such as water-based slurries. Methods comprise forming a mixture of silicon particles with nanoparticles (NPs) and a carbon-based binders and/or surfactants, wherein the NPs comprise at least one of: metalloid oxide NPs, metalloid salt NPs and carbon NPs, reducing the mixture to yield a reduced mixture comprising coated silicon particles with a coating providing a passivation layer (possibly amorphous), and consolidating the reduced mixture to form an anode. It is suggested that the NPs provide nucleation sites for the passivation layer on the surface of the silicon particles—enabling significant anode-formation process simplifications such as using water-based slurries—enabled by disclosed methods and anode active material particles.

25 Claims, 8 Drawing Sheets

(51) Int. Cl.
*H01M 4/36* (2006.01)
*H01M 4/62* (2006.01)
*H01M 4/136* (2010.01)
*H01M 4/1397* (2010.01)
*H01M 4/02* (2006.01)
*H01M 4/04* (2006.01)
*H01M 4/134* (2010.01)

(52) U.S. Cl.
CPC ........... *H01M 4/364* (2013.01); *H01M 4/621* (2013.01); *H01M 4/625* (2013.01); *H01M 10/0525* (2013.01); *H01M 4/0471* (2013.01); *H01M 4/134* (2013.01); *H01M 4/366* (2013.01); *H01M 4/622* (2013.01); *H01M 4/623* (2013.01); *H01M 2004/027* (2013.01); *H01M 2004/028* (2013.01); *Y02E 60/10* (2013.01)

(58) Field of Classification Search
CPC ........... H01M 10/0525; H01M 4/0471; H01M 2004/027; H01M 4/134; H01M 4/622; H01M 4/386; H01M 4/621; H01M 4/366; H01M 4/625; H01M 4/1397
USPC ........................................................ 429/217
See application file for complete search history.

(56) References Cited

U.S. PATENT DOCUMENTS

| | | |
|---|---|---|
| 6,492,061 B1 | 12/2002 | Gauthier et al. |
| 6,541,156 B1 | 4/2003 | Fuse et al. |
| 6,558,438 B1 | 5/2003 | Satoh |
| 6,599,662 B1 | 7/2003 | Chiang et al. |
| 7,192,673 B1 | 3/2007 | Ikeda et al. |
| 7,656,120 B2 | 2/2010 | Neu et al. |
| 7,906,238 B2 | 3/2011 | Le |
| 7,956,576 B2 | 6/2011 | Neu et al. |
| 8,021,791 B1 | 9/2011 | Plichta et al. |
| 8,945,774 B2 | 2/2015 | Coowar et al. |
| 8,951,673 B2 | 2/2015 | Wessells et al. |
| 9,406,927 B1 | 8/2016 | Burshtain et al. |
| 9,472,804 B2 | 10/2016 | Burshtain et al. |
| 9,583,761 B2 | 2/2017 | Burshtain et al. |
| 9,728,776 B2 | 8/2017 | Burshtain et al. |
| 9,871,247 B2 | 1/2018 | Burshtain et al. |
| 10,096,859 B2 | 10/2018 | Burshtain et al. |
| 10,110,036 B2 | 10/2018 | Aronov |
| 10,199,646 B2 | 2/2019 | Burshtain et al. |
| 10,199,677 B2 | 2/2019 | Drach et al. |
| 10,290,864 B2 | 5/2019 | Burshtain et al. |
| 10,293,704 B2 | 5/2019 | Aronov |
| 10,355,271 B2 | 7/2019 | Burshtain et al. |
| 2001/0017531 A1 | 8/2001 | Sakakibara et al. |
| 2002/0122980 A1 | 9/2002 | Fleischer et al. |
| 2002/146623 A1 | 10/2002 | Suzuki et al. |
| 2003/0039889 A1 | 2/2003 | Park et al. |
| 2004/0033360 A1 | 2/2004 | Armand et al. |
| 2004/0219428 A1 | 11/2004 | Nagayama |
| 2005/0019659 A1 | 1/2005 | Shiozaki et al. |
| 2005/0093512 A1 | 5/2005 | Mader et al. |
| 2007/0003837 A1 | 1/2007 | Nishimura et al. |
| 2007/0281216 A1 | 12/2007 | Petrat et al. |
| 2007/0284159 A1 | 12/2007 | Takami et al. |
| 2008/0093143 A1 | 4/2008 | Sharris |
| 2008/0248386 A1 | 10/2008 | Obrovac et al. |
| 2009/0111020 A1 | 4/2009 | Yamaguchi et al. |
| 2009/0179181 A1 | 7/2009 | Zhang et al. |
| 2009/0317637 A1 | 12/2009 | Luhrs et al. |
| 2010/0134065 A1 | 6/2010 | Iida |
| 2010/0134305 A1 | 6/2010 | Lu et al. |
| 2010/0159331 A1 | 6/2010 | Lee et al. |
| 2010/0190059 A1 | 7/2010 | Graetz et al. |
| 2011/0123870 A1 | 5/2011 | Oh et al. |
| 2011/0257001 A1 | 10/2011 | Negishi |
| 2011/0260689 A1 | 10/2011 | Kano |
| 2012/0045696 A1 | 2/2012 | Herle |
| 2012/0088155 A1 | 4/2012 | Yushin et al. |
| 2012/0164531 A1 | 6/2012 | Chen et al. |
| 2012/0219831 A1* | 8/2012 | Mak .............. H01M 12/04 977/734 |
| 2013/0040226 A1 | 2/2013 | Yamauchi et al. |
| 2013/0059174 A1 | 3/2013 | Zhamu |
| 2013/0071731 A1 | 3/2013 | Tokuda et al. |
| 2013/0224594 A1 | 8/2013 | Yushin et al. |
| 2013/0229153 A1 | 9/2013 | Sarkar et al. |
| 2013/0260285 A1 | 10/2013 | Yamauchi et al. |
| 2013/0266875 A1 | 10/2013 | Matsumoto et al. |
| 2013/0295454 A1* | 11/2013 | Huang .............. H01M 10/0525 429/211 |
| 2013/0337314 A1 | 12/2013 | Essaki et al. |
| 2014/0004426 A1 | 1/2014 | Kerlau et al. |
| 2014/0113202 A1 | 4/2014 | Sun et al. |
| 2014/0127588 A1 | 5/2014 | Kato et al. |
| 2014/0295267 A1 | 10/2014 | Wang |
| 2015/0017515 A1 | 1/2015 | Jeon et al. |
| 2015/0046110 A1 | 2/2015 | Joe et al. |
| 2015/0086870 A1* | 3/2015 | Fukasawa ................ H01M 4/58 429/218.1 |
| 2015/0221977 A1 | 8/2015 | Hallac et al. |
| 2015/0367747 A1 | 12/2015 | Decker et al. |
| 2016/0028075 A1* | 1/2016 | Yu .......................... H01M 4/366 429/219 |
| 2016/0036045 A1 | 2/2016 | Burshtain et al. |
| 2016/0064773 A1 | 3/2016 | Choi et al. |
| 2016/0104882 A1 | 4/2016 | Yushin et al. |
| 2016/0149220 A1 | 5/2016 | Uhm et al. |
| 2016/0264124 A1 | 9/2016 | Hotta |
| 2017/0012279 A1 | 1/2017 | Burshtain et al. |
| 2017/0040598 A1* | 2/2017 | Wang ................. H01M 4/625 |
| 2017/0117538 A1* | 4/2017 | Bendimerad ......... H01M 4/366 |
| 2017/0194631 A1* | 7/2017 | Favors ................. H01M 4/366 |
| 2017/0177121 A1 | 10/2017 | Herle |
| 2017/0288232 A1 | 10/2017 | Herle |
| 2017/0288271 A1 | 10/2017 | Le |
| 2017/0294643 A1 | 10/2017 | Burshtain et al. |
| 2017/0294644 A1* | 10/2017 | Burshtain ........... H01M 4/0471 |
| 2017/0294648 A1* | 10/2017 | Burshtain ........... H01M 4/0404 |
| 2017/0294680 A1 | 10/2017 | Burshtain et al. |
| 2017/0294687 A1 | 10/2017 | Burshtain et al. |
| 2017/0373513 A1 | 12/2017 | Aronov et al. |
| 2018/0069235 A1* | 3/2018 | Lee ....................... H01M 4/587 |
| 2018/0212236 A1 | 7/2018 | Jacob et al. |
| 2018/0212239 A1 | 7/2018 | Jacob et al. |
| 2018/0212240 A1 | 7/2018 | Jacob et al. |
| 2018/0212439 A1 | 7/2018 | Aronov |
| 2018/0301696 A1* | 10/2018 | Barker ................. H01M 4/587 |
| 2018/0301757 A1 | 10/2018 | Burshtain et al. |
| 2018/0315990 A1 | 11/2018 | Paz et al. |
| 2019/0006665 A1* | 1/2019 | Capiglia ................ H01M 4/387 |
| 2019/0044133 A1 | 2/2019 | Burshtain et al. |
| 2019/0044180 A1 | 2/2019 | Drach et al. |
| 2019/0140258 A1 | 5/2019 | Burshtain et al. |
| 2019/0143841 A1 | 5/2019 | Aronov |
| 2019/0148713 A1 | 5/2019 | Burshtain et al. |
| 2019/0148722 A1 | 5/2019 | Burshtain et al. |
| 2019/0148774 A1 | 5/2019 | Kuks et al. |
| 2019/0157669 A1 | 5/2019 | Burshtain et al. |
| 2019/0157727 A1 | 5/2019 | Jacob et al. |
| 2019/0173077 A1* | 6/2019 | Mangolini ........ H01M 10/0525 |
| 2019/0198912 A1 | 6/2019 | Sella et al. |
| 2019/0348672 A1* | 11/2019 | Wang ................. H01M 4/0495 |
| 2020/0220153 A1* | 7/2020 | Xiao ................... H01M 4/0471 |
| 2020/0313162 A1* | 10/2020 | Zhamu ................. H01M 4/366 |
| 2020/0411852 A1* | 12/2020 | Zhang ................. H01M 4/625 |

FOREIGN PATENT DOCUMENTS

| | | |
|---|---|---|
| CN | 101734675 | 6/2010 |
| CN | 104577081 | 4/2015 |
| EP | 1999818 | 12/2008 |
| EP | 2889097 | 7/2015 |

(56) References Cited

FOREIGN PATENT DOCUMENTS

| JP | 2002-056891 | 2/2002 |
|---|---|---|
| JP | 2006-216276 | 8/2006 |
| JP | 2007-323837 | 12/2007 |
| JP | 2008-053092 | 3/2008 |
| JP | 2012/131674 | 7/2012 |
| JP | 2014-002834 | 1/2014 |
| KR | 2012-121265 | 10/2012 |
| KR | 2015-0015070 | 2/2015 |
| TW | 200616268 | 5/2006 |
| WO | WO 2013/040356 | 3/2013 |
| WO | WO 2014068036 | 5/2014 |
| WO | WO 2015/145521 | 10/2015 |
| WO | WO 2016/031082 | 3/2016 |
| WO | WO 2018/109774 | 6/2018 |

OTHER PUBLICATIONS

Chaudhuri et al. "Core/shell nanoparticles: classes, properties, synthesis mechanisms, characterization, and applications" Chemical Reviews, vol. 112, No. 4, pp. 2373-2433, 2012.

Wu et al. "Hydrogen Storage in Pillared Li-Disperesed Boron Carbide Nanotubes", J. Phys. Chem. C, 2008, vol. 112, No. 22, pp. 8458-8463.

Secrist "Compound Formation in the Systems Lithium-Carbon and Lithium-Boron", Journal of the American Ceramic Society, Oct. 1967, vol. 50, No. 10, pp. 520-523.

Suzuki et al. "Silicon nitride thin film electrode for lithium-ion batteries", Journal of Power Sources, 2013, vol. 231, pp. 186-189.

Konno et al. "Application of Si—C—O glass-like compounds as negative electrode materials for lithium hybrid capacitors", Journal of Power Sources, 2009, vol. 191, No. 2, 623-627.

Hu et al. "Silicon/graphene based nanocomposite anode: large-scale production and stable high capacity for lithium ion batteries", Journal of Materials Chemistry A, 2014, vol. 2, No. 24, pp. 9118-9125.

Cui et al. "Carbon-Silicone Core-Shell Nanowires as High Capacity Electrode for Lithium Ion Batteries" Nano Letters, May 8, 2009, vol. 9, No. 9, pp. 3370-3374.

Kennedy et al. "High-Performance Germanium Nanowire-Based Lithium-Ion Battery Anodes Extending over 1000 Cycles Through in Situ Formation of a Continuous Porous Network", Nano Letters, 201, vol. 14, pp. 716-723.

Hwang et al. "Mesoporous Ge/GeO2/Carbon Lithium-Ion Battery Anodes with High Capacity and High Reversibility", ACS Nano, Apr. 13, 2015, vol. 9, No. 5, pp. 5299-5309.

Balomenos et al. "Exergy Analysis of Metal Oxide Carbothemic Reduction under Vacuum—Sustainability prospects", International Journal of Thermodynamics, Jun. 4, 2012, vol. 15, No. 3, pp. 141-146.

Barton et al. "The Reduction of Germanium Dioxide With Graphite at High Temperatures", Journal of the Less-Common Metals, 1970, vol. 22, pp. 11-17.

Nitta et al. "High-Capacity Anode Materials for Lithium-Ion Batteries: Choice of Elements and Structures for Active Particles", Particle Systems Characterization, 2014, vol. 31, pp. 317-336.

Chung et al. "Electronically conductive phospho-olivines as lithium storage electrodes", nature materials, Oct. 22, 2002, vol. 1, pp. 123-128.

Kennedy et al. "Nanowire Heterostructure Comprising Germanium Stems and Silicon Branches as High-Capacity Li-Ion Anodes with Tunable Rate Capability", ACS Nano, Jun. 30, 2015, vol. 9, No. 7, pp. 7456-7465.

Kyotani et al. "Remarkable performance improvement of inexpensive ball-milled Si nanoparticles by carbon-coating for Li-Ion batteries", Journal of Power Sources, Jul. 1, 2016, vol. 319, pp. 99-103.

Son et al. "Silicon carbide-free graphene growth on silicon for lithium-ion battery with high volumetric energy density", Nature Communications, Jun. 25, 2015, vol. 6, No. 7393, pp. 1-8.

Tow et al. "A Study of Highly Oriented Pyrolytic Graphite as a Model for the Graphite Anode in Li-Ion Batteries", Journal of The Electrochemical Society, 1999, vol. 146, No. 3, pp. 824-832.

Qi et al. "Threefold Increase in the Young's Modulus of Graphite Negative Electrode during Lithium Intercalation", Journal of The Electrochemical Society, 2010, vol. 157, No. 5, pp. A558-A566.

Qi et al. "Lithium Concetration Dependent Elastic Properties of Battery Electrode Materials from First Principles Calculations", Journal of The Electrochemical Society, 2014, vol. 161, No. 11, pp. F3010-F3018.

Wen et al. "Thermodynamic and Mass Transport Properties of "LIAI"", Solid-State Science and Technology, Dec. 1979, vol. 126, No. 12, pp. 2258-2266.

Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.

Sun et al. "Silicon/Wolfram Carbide@Graphene composite: enhancing conductivity and structure stability in amorphous-silicon for high lithium storage performance", Electrochimica Acta, Jun. 25, 2016, vol. 191, pp. 462-472.

Cho et al. "Zero-Strain Intercalation Cathode for Rechargeable Li-Ion Cell", Angewandte Chemie, 2001, vol. 40, No. 18, pp. 3367-3369.

Ngo et al. "Mass-scalable synthesis of 3D porous germanium-carbon composite particles as an ultra-high rate anode for lithium ion batteries", Energy & Environmental Science, 2015, vol. 8, pp. 3577-3588.

Billaud et al. "Synthesis and electrical resistivity of lithium-pyrographite intercalation compounds (stages I, II and III)", Materials Research Bulletin, Jul. 1979, vol. 1, No. 7, pp. 857-864.

Guriparti et al. "Review on recent progress of nanostructured anode materials for Li-ion batteries", Journal of Power Sources, 2014, vol. 257, pp. 421-443.

Scott et al. "Ultrathin Coatings on Nano-LiCoO2 for Li-Ion Vehicular Applications", Nano Letters, 2011, vol. 11, pp. 414-418.

Chen et al. "Conductive Rigid Skeleton Supported Silicon as High-Performance Li-Ion Battery Anodes", Nano Letters, 2012, vol. 12, pp. 4124-4130.

Kim et al. "Electrochemical properties of carbon-coated Si/B composite anode for lithium ion batteries", Journal of Power Sources, 2009, vol. 189, pp. 108-113.

Wang et al. "Boron-doped carbon nanotube-supported Pt nanoparticles with improved CO tolerance for methanol electro-oxidation", Phys. Chem. Chem. Phys., 2012, vol. 14, pp. 13910-13913.

Wang et al. "The dimensionality of Sn anodes in Li-ion batteries", materialstoday, Dec. 2012, vol. 15, No. 12, pp. 544-552.

Bhandavat et al. "Improved Electrochemical Capacity of Precursor-Derived Si(B)CN-Carbon Nanotube Composite as Li-Ion Battery Anode", ACS Applied Materials & Interfaces, Oct. 2, 2012, vol. 4, pp. 5092-5097.

Bhandavat et al. "Synthesis, Characterization, and High Temperature Stability of Si(B) CN-Coated Carbon Nanotubes Using a Boron-Modified Poly(ureamethylvinyl)Silazane Chemistry", Journal of the American Ceramic Society, 2012, vol. 95, No. 5, pp. 1536-1543.

Nowotny et al. "Investigations in the three systems: Molybdenum-Silicon-boron, tungsten-Silicon-boron and in which System: VS12—TaSi2", MB. Chem., 1956, vol. 88, No. 2, pp. 179-182.

Kasavajjula et al. "Nano- and bulk-silicon-based insertion anodes for lithium-ion secondary cells", Journal of Power Sources, 2007, Vo. 163, pp. 1003-1039.

Yom et al. "Improved electrochemical behavior of Tungsten Coated Silicon Monoxide-Carbon composite anode in lithium ion battery",Abstract #1041, The Electrochemical Society 224th ECS Meeting, Oct. 27-Nov. 1, 2013.

Liu et al. "A pomegranate-inspired nanoscale design for large-volume-change lithium batter anodes", Nature Nanotechnology, Mar. 2014, vol. 9, pp. 187-192.

Tao et al. "Hollow core-shell structured Si/C nanocomposites as high-performance anode materials for lithium-ion batteries", Nanoscale, 2014, vol. 6, pp. 3136-3142.

(56) References Cited

OTHER PUBLICATIONS

Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
Byeon "Multifunctional metal-polymer nanoaggiomerates from singlepass aerosol self-assembly", Scientific Reports, Aug. 10, 2016, pp. 1-8.
Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-17.
Maoz et al. "Site-Targeted Interfacial Solid-Phase Chemistry: Surface Functionalization of Organic Monolayers via Chemical Transformations locally Induced at the Boundary between Two Solids", Angewandte Chemie, 2016, vol. 55, pp. 12368-12371.
Molino et al. "Hydrophobic conductin polymer films from post deposition thiol exposure", Synthetic Metals 162, 2012, pp. 1464-1470.
Jankovski et al. "New boron based salts for lithium-ion batteries using conjugated ligands", Physical Chemistry Chemical Physics, May 19, 2016, vol. 18, pp. 16274-16280.
Aurbach et al. "A short review of failure mechanisms of lithium metal and lithiated graphite anodes in liquid electrolyte solutions", Solid State Ionics, 2002, vol. 148, pp. 405-416.
He et al. "Effect of solid electrolyte interface (SEI) film on cyclic performance of Li4Ti5O12 anodes for Li ion batteries", Journal of Power Sources, 2013, vol. 239, pp. 269-276.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1,33Ti1,67O4 Spinel", Journal of The Electrochemical Society, 1999, vol. 146, No. 3, pp. 857-861.
Doughty et al. "A General Discussion of Li Ion Battery Safety", The Electrochemical Society Interface, 2012, pp. 37-44.
E. McRae and J.F. Mareche "Stage dependence of the electrical resitivity of graphite intercalation compounds" Journal of Physics C: Solid State Physics, vol. 18, No. 8, Apr. 5, 1983, pp. 1627-1640, Lab. de Chimie du Solide Miner., Nancy Univ., Vandoeuvre, France.
Takatoshi Kasukabe et al. "Beads-Milling of Waste Si Sawdust into High-Performance Nanoflakes for Lithium-Ion Batteries" Sci Rep 2017; 7: 42734. Published online Feb. 20, 2017.
Yongxin An et al. "Effects of VC—LiBOB binary additives on SEI formation in ionic liquid-organic composite electrolyte" RSC Advances, 2012, 2, Accepted Feb. 21, 2012, pp. 4097-4102.
Aaron M. Chockla "Tin-Seeded Silicon Nanowires for High Capacity Li-Ion Batteries" Department of Chemical Engineering, Texas Materials Institute, Center for Nano- and Molecular Science and Technology,The University of Texas at Austin, Austin, Texas 78712-1062, United States, pp. 3738-3745, Published: Sep. 11, 2012.
Yong-Mao Lin et al. "High performance silicon nanoparticle anode in fluoroethylene carbonate-based electrolyte for Li-ion batteriesw" Chem. Commun. 2012, 48, Accepted May 28, 2012, pp. 7268-7270.
Rosa Martel Danoary Tsirinomeny "Contribution to the Ultra-Fast Charging of Electric vehicles: The Configurable Modular Multilevel Converter (CMMC)" Mots-clés de l'auteur: Ultra-fast; lithium-titanate; UFCEV; CMMC; Flex-EV. Mar. 4, 2016.
Xu et al. "Reversible Conversion of Conducting Polymer Films from Superhydrophobic to Superhydrophilic", Angewandte Chemie, 2005, vol. 44, pp. 6009-6012.
Aldrich (Sigma-Aldrich MSDS Lithium hexafluorophosphate {http://www.sigmaaldrich.com/MSDS/MSDS/DisplayMSDSPage.do?country=US&language=en&productNumber=450227&brand=ALDRICH} Printed Dec. 19, 2017).
Millipore (MSDS 1-Butyl-1-methylpyrrolidinium bis (trifluoromethylsulfonyl)imide high purity (http://www.emdmillipore.com/Web-US-Site/en_CA/-/USD/ProcessMSDS-Start?PlainSKU=MDA-CHEM-492046&Origin=PDF) date Nov. 4, 2014).
M. Moreno et al. "Ionic Liquid Electrolytes for Safer Lithium Batteries" Journal of The Electrochemical Society, 164 (1) A6026-A6031 (2017), pp. 6026-6031.
Andrzej Lewandowski et al. "Ionic liquids as electrolytes for Li-ion batteries—An Overview of Electrochemical studies" Journal of Power Sources 194 (2009) pp. 601-609.
Marisa C. Buzzeo et al. "Non-Haloaluminate Room-Temperature Ionic Liquids in Electrochemistry—A Review" ChemPhysChem 2004, 5, pp. 1106-1120.
International Search Report and Written Opinion of PCT Application No. PCT/IL2017/050424, dated Jul. 13, 2017.
Office action of U.S. Appl. No. 15/414,665 dated Aug. 14, 2017.
Office action of U.S. Appl. No. 15/447,784, dated Jun. 22, 2017.
Office action of U.S. Appl. No. 15/447,889 dated Jul. 17, 2017.
Office action of U.S. Appl. No. 15/480,919 dated Jul. 5, 2017.
Office action of U.S. Appl. No. 15/414,655, dated May 9, 2017.
Office action of U.S. Appl. No. 15/287,292, dated Dec. 15, 2017.
Office action of U.S. Appl. No. 15/447,784, dated Dec. 28, 2017.
Office Action of U.S. Appl. No. 15/480,888, dated Oct. 1, 2018.
Office Action of U.S. Appl. No. 15/853,885, dated Feb. 23, 2018.
Office action of U.S. Appl. No. 15/480,888 dated Sep. 13, 2017.
Office action of U.S. Appl. No. 15/447,784 dated Oct. 19, 2017.
Office action of U.S. Appl. No. 15/582,066 dated Aug. 21, 2017.
Office Action of U.S. Appl. No. 15/783,586, dated Apr. 6, 2018.
European Search Report for Application No. EP17206661.5, dated Apr. 16, 2018.
Office Action of U.S. Appl. No. 15/447,889, dated May 24, 2018.
Office Action of U.S. Appl. No. 15/480,904, dated Oct. 29, 2018.
Office Action of U.S. Appl. No. 15/480,911, dated Nov. 8, 2018.
Office Action of U.S. Appl. No. 15/480,922, dated Nov. 8, 2018.
Office Action of U.S. Appl. No. 15/844,689, dated Jan. 31, 2018.
Office Action of U.S. Appl. No. 15/844,689, dated Apr. 16, 2018.
Office Action of U.S. Appl. No. 15/844,689, dated May 23, 2018.
Notice of Allowance for U.S. Appl. No. 15/844,689, dated May 23, 2018.
Office Action of U.S. Appl. No. 16/254,644, dated Mar. 1, 2019.
Notice of Allowance for U.S. Appl. No. 16/258,726, dated Mar. 6, 2019.
Office Action of U.S. Appl. No. 16/266,527, dated Apr. 2, 2019.
Office Action of U.S. Appl. No. 15/853,885, dated May 1, 2019.
Office Action of U.S. Appl. No. 16/243,190, dated Jun. 12, 2019.
Kepler et al., "Copper-tin anodes for rechargeable lithium batteries: an example of the matrix effect in an intermetallic system" Journal of Power Sources 81-82: 1999. pp. 383-387.
Kepler et al., "LixCu6Sn5 (0<x<13): An Intermetallic Insertion Electrode for Rechargeable Lithium Batteries" Electrochemical and Solid-State Letters, 2 (7) 307-309 (1999).
Wange et al., "Lithium storage properties of nanocrystalline eta-cu 6 Sn 5 alloys prepared by ball-milling" Journal of Alloys and Compounds 299 , L12-L35, 2000.
Lee et al. "Fabrication of Carbon-Encapsulated Mono- and Bimetallic (Sn and Sn/Sb Alloy) Nanorods. Potential Lithium-Ion Battery Anode Materials" Chem. Mater. 2009, 21, 2306-2314.
Wange et al., Sn/graphene nanocomposite with 3D architecture for enhanced reversible lithium storage in lithium ion batteries Journal of Materials Chemistry, 2009, vol. 19, pp. 8378-8384.
Jo et al., "Synthesis and characterization of low temperature Sn nanoparticles for the fabrication of highly conductive ink" Nanotechnelogy 22 (2011) 225701 (8pp).

(56) References Cited

OTHER PUBLICATIONS

He et al., "Monodisperse Antimony Nanocrystals for High-Rate Li-ion and Na-ion Battery Anodes: Nana versus Bulk" *Nano Lett.* 2014, 14, 3, 1255-1262.

Touidjine et al., "Partially Oxidized Silicon Particles for Stable Aqueous Slurries and Practical Large-Scale Making of Si-Based Electrodes" *Journal of The Electrochemical Society,* 162 (8) A1466-A1475 (2015).

Wang et al., "Three-Dimensional Porous Carbon Nanosheet Networks Anchored with $Cu_6Sn_5$@Carbon as a High-Performance Anode Material for Lithium Ion Batteries" Electronic Supplementary Material (ESI) for RSC Advances 2016.

Yang et al., "Effects of lithium fluoride coating on the performance of nano-silicon as anode material for lithium-ion batteries" Materials Letters 184 (2016) 65-68.

Zhong et al., "Tin nanoparticles as an effective conductive additive in silicon anodes" *Scientific Reports* vol. 6, Article No. 30952 (2016).

Liu et al., "A dual functional wrapping layer for enhanced cyclic performance of high-loading silicon anodes" Electrochimica Acta 240 (2017) 1-6.

Zhang et al., "Silicon Nanoparticles: Stability in Aqueous Slurries and the Optimization of the Oxide Layer Thickness for Optimal Electrochemical Performance" ACS Appl. Mater. Interfaces 2017, 9, 32727-32736.

Hays et al., "Si Oxidtion and $H_2$ Gassing During Aqueous Slurry Preparation for Li-Ion Battery Anodes" *J. Phys. Chem. C* 2018, 122, 18, 9746-9754, including supportion information.

Rodrigues et al. "Quantifying gas generation from slurries used in fabrication of Si-containing electrodes for lithium-ion cells" Journal of Power Sources 395 (2018) pp. 289-294.

Yao et al., "Chemical Reduction Synthesis and Electrochemistry of Si—Sn Nanocomposites as High-Capacity Anode for Li-Ion Batteries" *J. Phys. Chem. Lett.,* 21 Aug. 2018.

Yuan et al., "SnSb alloy nanoparticles embedded in N-doped porous carbon nanofibers as a high-capacity anode material for lithium-ion batteries" Journal of Alloys and Compounds, vol. 777, Mar. 10, 2019, pp. 775-783.

Qu et al., "Origin of the Increased $Li^+$-Storage Capacity of Stacked $SnS_2$/Graphene Nanocomposite" vol. 2, Issue 8, Aug. 2015, pp. 1138-1143.

\* cited by examiner

PASSIVATED SILICON-BASED ANODE MATERIAL PARTICLES

BACKGROUND OF THE INVENTION

1. Technical Field

The present invention relates to the field of lithium ion batteries, and more particularly, to anode material particles, mixtures thereof and anode prepared therefrom.

2. Discussion of Related Art

Continuous effort is made to develop lithium ion batteries with larger capacity, enhanced safety and higher charging rates. Silicon as anode active material provides larger capacity, but is reactive and required careful handling in a non-oxidizing environment.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising: forming a mixture of silicon particles with nanoparticles (NPs) and a carbon-based binder and/or surfactant, wherein the NPs comprise at least one of: metalloid oxide NPs, metalloid salt NPs, Sb and/or Cu salt NPs, Sn, Sb, Cu, SnSb alloy and/or SnCu alloy NPs, metallic Ag, Au, Pb and/or Ge NPs, and carbon NPs, reducing the mixture to yield a reduced mixture comprising coated silicon particles having a passivation coating, and consolidating the reduced mixture to form an anode.

One aspect of the present invention provides a mixture of anode material particles comprising coated silicon particles having, covering the particles, respective passivation layers that inhibit reactions of the Si in an oxidizing environment.

One aspect of the present invention provides an anode for fast charging lithium ion batteries, the anode comprising a reduced mixture of coated silicon particles having respective passivation layers, consolidated with binder and conductive materials from a water-based slurry to form the anode, wherein the mixture is reduced from a mixture of the silicon particles with nanoparticles (NPs) and a carbon-based binder and/or surfactant, and wherein the NPs comprise at least one of: metalloid oxide NPs, metalloid salt NPs, Sb and/or Cu salt NPs, Sn, Sb, Cu, SnSb alloy and/or SnCu alloy NPs, metallic Ag, Au, Pb and/or Ge NP, and carbon NPs.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
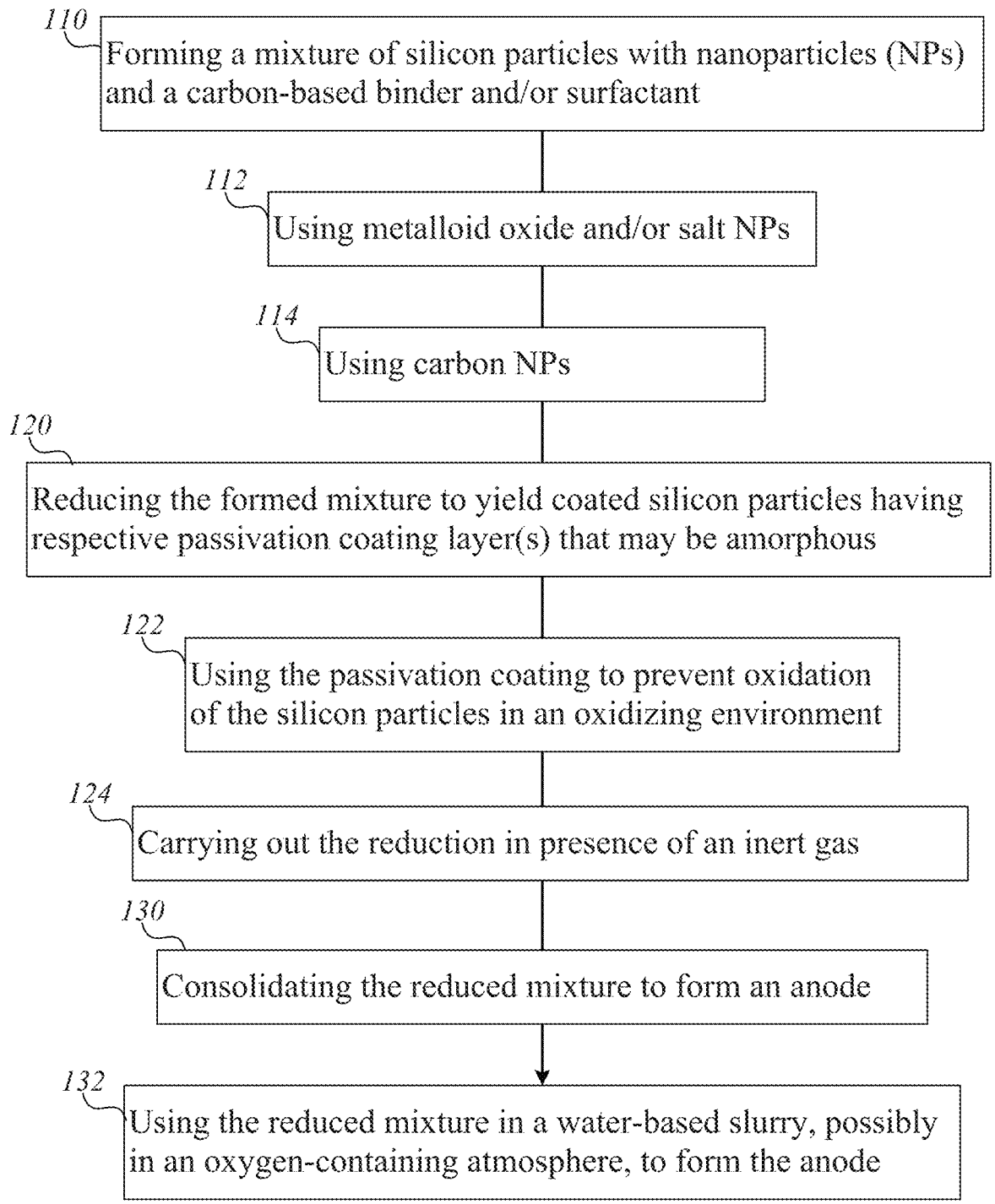
FIG. 1 is a high-level schematic flowchart illustrating a method, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanism for preparing lithium ion batteries and anodes therefor and thereby provide improvements to the technological field of energy storage. Methods, anode material particles, mixtures, anodes and lithium-ion batteries are provided, having passivated silicon-based particles that enable processing in oxidizing environments such as water-based slurries. Methods comprise forming a mixture of silicon particles with nanoparticles (NPs) and a carbon-based binders and/or surfactants, wherein the NPs comprise at least one of: metalloid oxide NPs, metalloid salt NPs and carbon NPs, reducing the mixture to yield a reduced mixture comprising coated silicon particles having a passivation coating providing a passivation layer (possibly amorphous), and consolidating the reduced mixture to form an anode. It is suggested that the NPs provide nucleation sites for the passivation layer on the surface of the silicon particles—enabling significant anode-formation process simplifications such as using water-based slurries—enabled by disclosed methods and anode active material particles.

FIG. 1 is a high-level schematic flowchart illustrating a method 100, according to some embodiments of the invention. Method 100 may comprise the following stages, irrespective of their order. Method 100 comprises forming a mixture of silicon particles with nanoparticles (NPs) and a carbon-based binder and/or surfactant (stage 110), wherein the NPs comprise at least one of: metalloid oxide NPs, metalloid salt NPs (stage 112) and carbon NPs (stage 114), reducing the formed mixture to yield coated silicon particles respective passivation coating layer(s) that may be amorphous (stage 120), and consolidating the reduced mixture to form an anode (stage 130). Advantageously, the reduced mixture may be used in a water-based slurry, possibly in an oxygen-containing atmosphere, to form the anode (stage 132), with the passivation coating preventing oxidation of the silicon particles in the water-based slurry (stage 122), acting as a passivation layer. It is noted that the formation of the passivation layer on the silicon particles, which enables their processing in a water-based slurry, is surprising and was not expected. Without being bound by theory, it is suggested that the NPs may provide nucleation sites for forming the passivation layer coating on the silicon particles (possibly from carbon in the binder and/or surfactant), which is stable and thick enough (e.g., between 5-20 nm thick) to prevent oxidization of the silicon particles during anode preparation—simplifying significantly the anode preparation process. Non-limiting examples for the NPs comprise any of tin oxide (SnO, $SnO_2$) NPs, tin salt (e.g., $SnCl_2$) NPs, carbon (e.g., SC65) NPs, $SbCl_2$ or other antimony (Sb) salts NPs, $CuCl_2$ or other copper salts NPs, Sn, Sb, Cu, SnSb alloy and/or SnCu alloy NPs, as well as NPs of antimony and/or tin alloys such as comprising at least one of Fe, Cu and Co alloys of Sn and/or Sb. In various embodiments, the NPs may be metallic, and not reduced in the process, and possibly comprise other materials such as Ag, Au, Pb, Ge.

Forming the mixture (stage 110) may be carried out by mixing, e.g., with magnetic stirrer or sonication. Reducing the mixture (stage 120) may be carried out in a tube furnace and evolving gases such as CO and/or $CO_2$ may be removed from the container during the reduction. In certain embodiments, reducing 120 may be carried out in solution with a reducing agent. e.g., sodium borohydride, at a temperature below 200° C.

In various embodiments, the NPs may provide 0.1%-30% (w/w) or possibly up to 50% of the dry material in the mixture. In various embodiments, the silicon particles may provide up to 90% (w/w) of the mixture. In various embodiments, the carbon-based binder and/or surfactant may comprise PVP (polyvinylpyrrolidone). In certain embodiments, the carbon-based binder and/or surfactant may comprise PAA (poly(acrylic acid)) or Li-PAA, and/or any of PVDF (polyvinylidene difluoride), CMC (carboxymethyl cellulose), polypyrrole, PEDOT-PSS (poly(3,4-ethylene dioxythiophene): poly(styrene sulfonate)), polyaniline, polyethylene oxide, polyvinyl acetate, polyvinyl alcohol, citric acid/citrate salt, cetrimonium bromide, and their respective derivatives, combinations and/or equivalent carbon-based binders and/or surfactant.

In certain embodiments, reducing 120 may be carried out by heating the mixture at a temperature in a range of 700° C. or 800° C. to 1000° C.

It is noted that using silicon particles, carbothermal reduction requires high temperatures which may not be feasible or practical in the context of anode material production. Without being bound by theory, the coating may comprise a very thin silicon carbide coating that may be produced at temperatures that are lower than required for Si reduction. For example, the very thin SiC layer may be 0.1-3 nm thick, and may be formed at temperatures as low as 1000° C., or even at temperatures as low as 700° C. or 800° C. In certain embodiments, reduction 120 may be carried out in the presence of an inert gas (stage 124), which may be part of the atmosphere in which the particles are heated. In certain embodiments, reduction 120 may be carried out in the presence of a carbon-based gas, to complement the carbon-based binder and/or surfactant if needed. Advantageously, the SiC layer may reduce Si reactivity—yielding passivation, that may enable processing anode active material particles into anode in an environment that does not completely exclude water or oxygen, simplifying the production processes.

Figure 2:
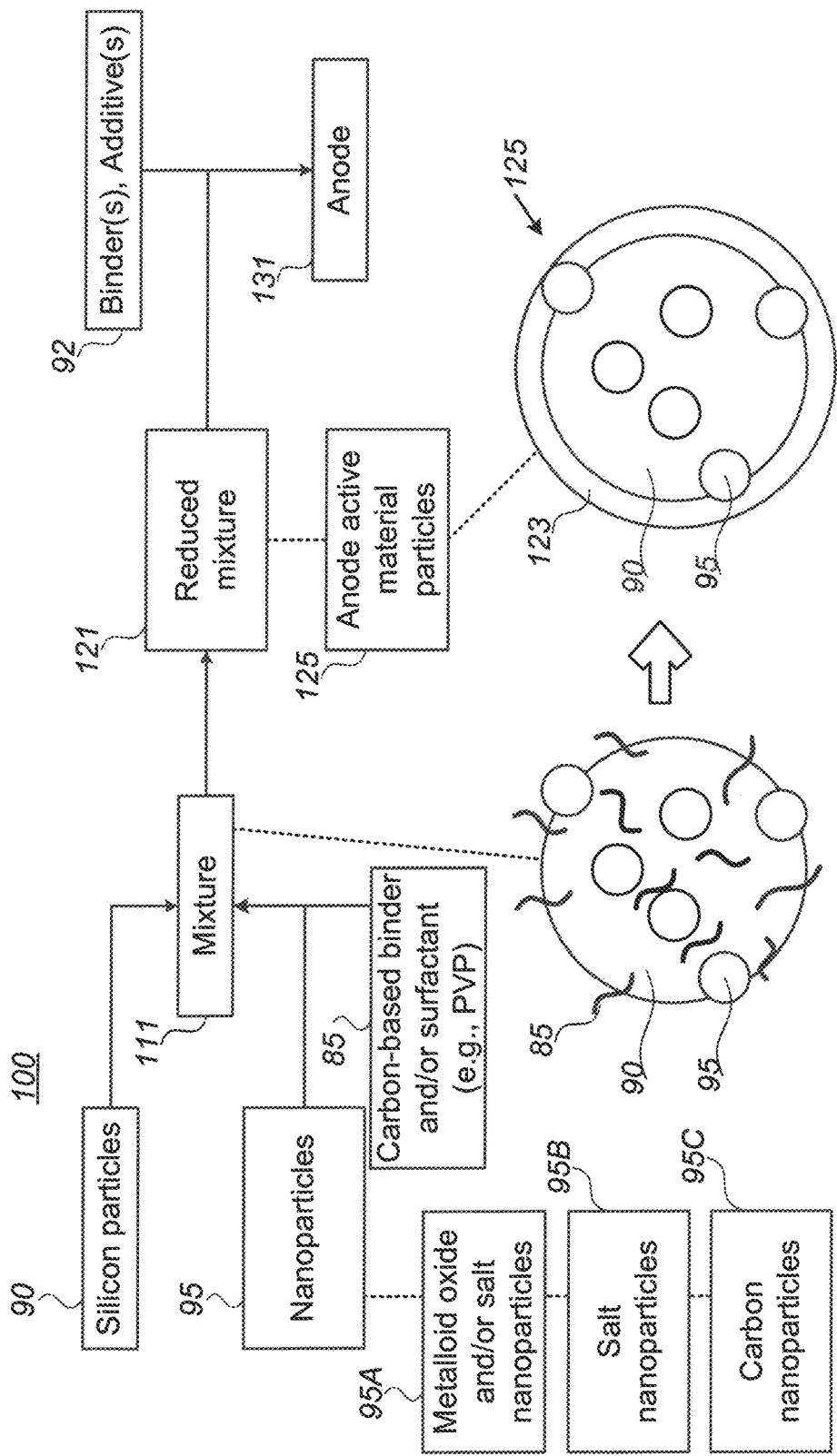
FIG. 2 is a high-level schematic illustration of methods and materials forming the anode active materials and the anodes, according to some embodiments of the invention.

FIG. 2 is a high-level schematic illustration of method 100 and materials forming anode active materials 125 and anode 131, according to some embodiments of the invention.

Certain embodiments comprise a mixture 121 of anode material particles 125 comprising silicon particles 90 having carbon passivation layers 123 (possibly amorphous) that are non-reactive in an oxidizing environment. Certain embodiments comprise anodes 131 for fast charging lithium ion batteries, which comprise mixture 121 of anode material particles 125, consolidated with binder and conductive materials 92 from a water-based slurry.

Certain embodiments comprise anodes 131 for fast charging lithium ion batteries, which comprise reduced mixture 121 of silicon particles 90 having passivation layers 123 (possibly carbon-based, possibly amorphous), consolidated with binder and conductive materials 92 from a water-based slurry to form anode 131, wherein mixture 121 is reduced from a mixture 111 of silicon particles 90 with nanoparticles (NPs) 95 such as metalloid oxide and/or salt NPs 95A (e.g., any of SnO, $SnO_2$, $SnCl_2$), salt NPs 95B (e.g., $SbCl_2$ or other antimony salts, $CuCl_2$ or other copper salts, as well as antimony and/or tin alloys) and/or carbon NPs 95C (e.g., carbon black, SC65), and a carbon-based binder and/or surfactant 85 (e.g., PVP or any other carbon-based binder/surfactant, e.g., as listed above).

In certain embodiments, NPs 95 may comprise 10-15 nm, 10-50 nm and/or 10-100 nm tin oxide and/or salt NPs 95A. In certain embodiments, NPs 95 may provide 0.1%-30% (w/w) of mixture 111 or possibly up to 50% of the dry weight of the mixture. In certain embodiments, silicon particles 90 may be 100-500 nm and/or 100-1000 nm in diameter, and may provide up to 90% (w/w) of the mixture. In certain embodiments, the thickness of coating 123 may be any of: 1 nm-5 nm, 5 nm-10 nm, 1 nm-10 nm, 5-20 nm, 10-20 nm, 20 nm-30 nm, 20-50 nm, 20 nm-100 nm, 50 nm-100 nm, or any partial range of combination of ranges. Coating 123 may be at least partly carbon-based, or fully carbon-based. For example, coating 123 may comprise amorphous and/or crystalline carbon. In certain embodiments, coating 123 may comprise a 0.1-3 nm thick SiC layer. In various embodiments, coating 123 may comprise at least partly any of: $Al_2O_3$, $SiO_2$, $TiO_2$, LTO (lithium titanate), MgO and/or $ZrO_2$, which may provide passivation components, e.g., as products of calcination in air.

Figure 3A:
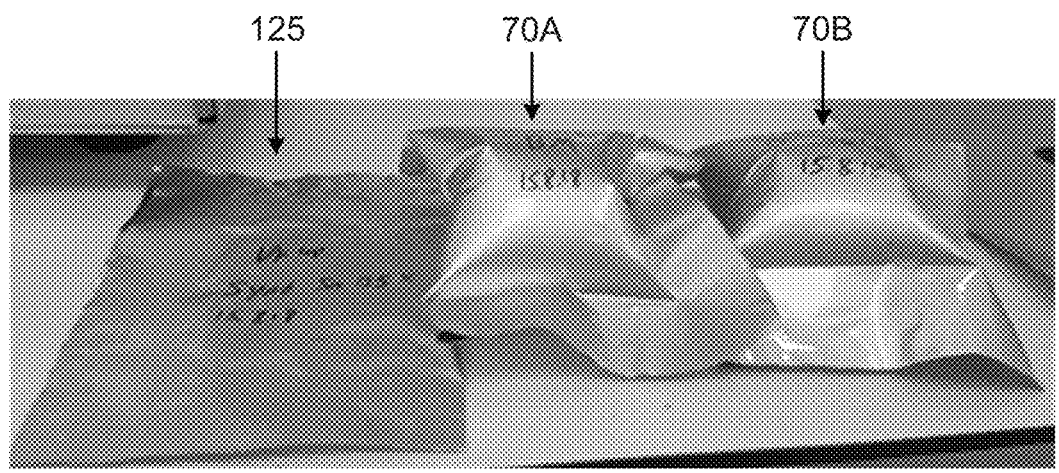
FIGS. 3A-3C provide experimental indications for characteristics and advantages of disclosed methods and anode active material particles, according to some embodiments of the invention.
Figure 3B:
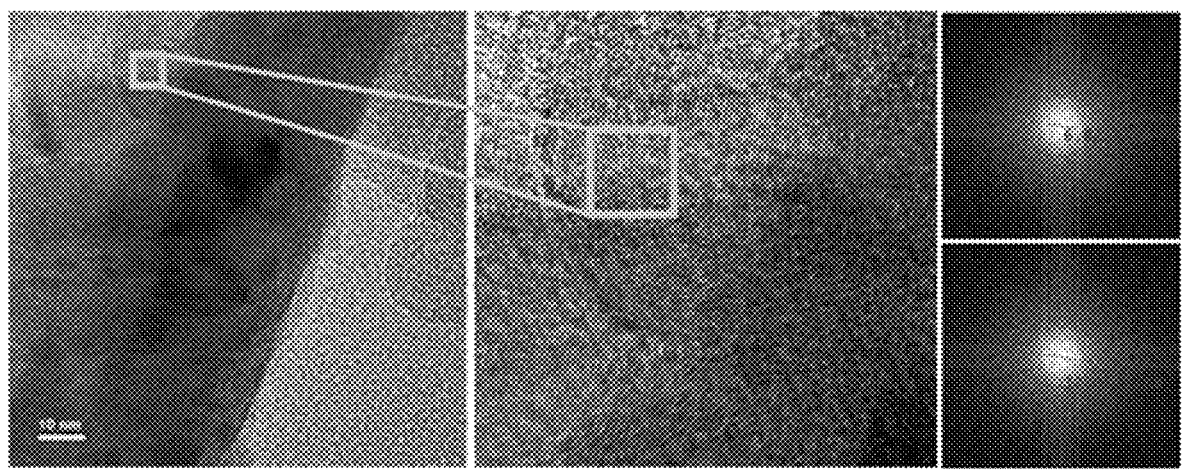
Figure 3C:
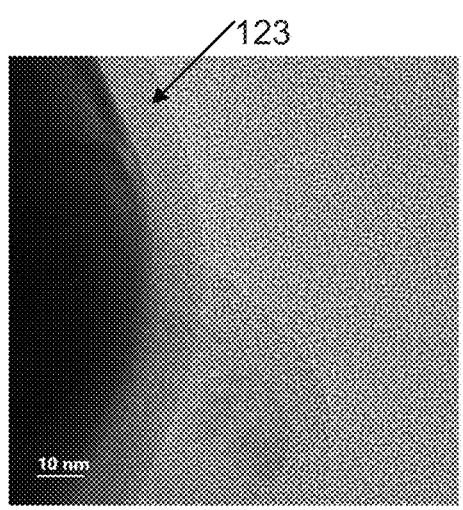

FIGS. 3A-3C provide experimental indications for characteristics and advantages of disclosed methods 100 and anode active material particles 125, according to some embodiments of the invention. FIG. 3A illustrates the non-reactivity of anode active material particles 125 with respect to the reactivity of prior art silicon-based anode active material particles 70A, 70B; FIG. 3B illustrates the decoration of silicon particles 90 by Sn NPs 95A; and FIG. 3C illustrates passivation coating 123 as amorphous coating 123, as explained below.

FIG. 3A provides an experimental indication of the passivation of active material particles 125 based on silicon particles 90, which is achieved by disclosed methods 100, according to some embodiments of the invention. Slurries were prepared from three types of anode material particles, namely—passivated particles 125 decorated with Sn NPs 95A, ball-milled silicon particles with native oxide layers and Sn 70A and ball-milled silicon particles with removed (and regrown) oxide layers and Sn 70B. The slurries were sealed within pouches and examined for reactivity according to hydrogen production upon reaction with the water in the slurry—causing inflation of the pouches in case of reactivity. After seven days in ambient conditions, only the pouch containing disclosed, passivated, anode material particles 125 did not expand. Moreover, FIG. 3A shows the pouches that were placed for two hours in 80° C. oven, to expedite the reaction, with similar results—only the pouch containing disclosed, passivated, anode material particles 125 did not expand. The non-reactive pouch was left in the 80° C. oven for additional two weeks, and still did not show any expansion—illustration the passivation of silicon particles due to amorphous coating 123. Without being bound by theory, it is suggested that passivation, possibly amorphous coating 123 prevented reactions between water or oxygen with the silicon, while prior art native oxide layers (70A) and re-grown oxide layers (70B) on the silicon particles did not reduce silicon reactivity. Advantageously, disclosed passivation simplifies the anode production processes significantly.

For comparison, the effect of using ethanol-based slurry instead of water-based slurry on the reactivity of Si was tested. Similar pouches were prepared, with the respective active material particles in ethanol-based slurry (the binder that was used in the ethanol-based slurry was polyacrylic acid, PAA, while the binder that was used in the water-based slurry for the pouches described above was Li-polyacrylate (the conjugate base of PAA), as the latter does not dissolve in ethanol), neither of which swelled after two months at 55° C. Pouches that were stored at 80° C. did expand, due to evaporation of the ethanol. Once removed from the furnace the pouches shrank back as they cooled, indicating that the expansion was not due to gas production in the irreversible chemical reaction, as seen for silicon in water-based slurries.

Certain embodiments comprise anode material particles slurries which are based on organic solvents, such as ethanol, butanol, propylene glycol, methyl ether or other organic solvents that reduce or prevent the reactivity of the anode material particles such as silicon particles. When using slurries with organic solvents, certain embodiments comprise silicon anode material particles which may be only partly or not necessarily passivated, as the organic solvent may provide additional protection against the material's reactivity, especially when anode preparation processes are carried out at industrial scales.

FIG. 3B provides a TEM (transmission electron microscopy) image showing the presence of metallic Sn NPs (nanoparticles) in the synthesis product, according to some embodiments of the invention. Materials used in preparing active particles 125 were Si powder, PVP 40,000 (Polyvinylpyrrolidone with average molecular weight of 40,000), $SnCl_2.2H_2O$ and SuperC 65 (conductive carbon black, SC65). The preparation of the anode material particles was carried out by mixing 5 gr of Si, 1gr of PVP, 1gr of SnC12 and 0.5 gr of SC65 with 100 ml of ethanol anhydrous, mixed well in a glass beaker, manually with a spatula, followed by probe sonication (½ inch probe, 10 min, using 80% amplitude with 7 sec on pulse, and 5 sec off pulse), while the beaker is immersed in an ice bath. After the sonication, the mixture was inserted into the oven overnight in 80° C. for drying. The dried material was crushed into powder using ball milling and magnetic stirring. The powder was then loaded into a quartz boat and inserted into a tube furnace. The furnace was purged with Ar and then heated to 700° C. at a ramp of 10° C. for a minute, and held at that temperature for 15 minutes. Finally, the furnace was cooled to room temperature under Ar flow.

XRD (X-ray diffraction) characterization showed the presence of metallic Sn in the synthesis product. Specifically, results were of 89.4% Si, 8.6% amorphous carbon, 1.2% Moissanite (a silicon carbide, SiC) and 0.8% Sn. The presence of metallic Sn NPs was based on FFT (fast Fourier transform) analysis (right-most images) of fringes indicated in FIG. 3B by the enlarged square, and which correspond to the expected Sn lattice spacing.

FIG. 3C provides a TEM image that illustrates the presence of amorphous coating 123 on particles 125 as one of the synthesis products. Based on the amorphous nature of the coating, the low contrast, and the thickness (too thick to be native oxide on silicon) it is concluded that it is the product of the carbonization and functions as the passivation layer that replaces the natural oxide layer on the silicon particles and allows further processing of silicon-based anode material particles 125 in an environment that may include water and/or oxygen.

Additional experimentation has shown that either tin-based or carbon-black-based NPs 95 were sufficient to form amorphous layer 123 as one or more passivation layer(s) on the silicon particles in the presence of the PVP as binder/surfactant, but when PVP was used without NPs 95, resulting anode material particles were reactive.

Additional experiments were performed to verify that cell performance was not reduced by amorphous coating 123 on anode material particles.

Figure 4A:
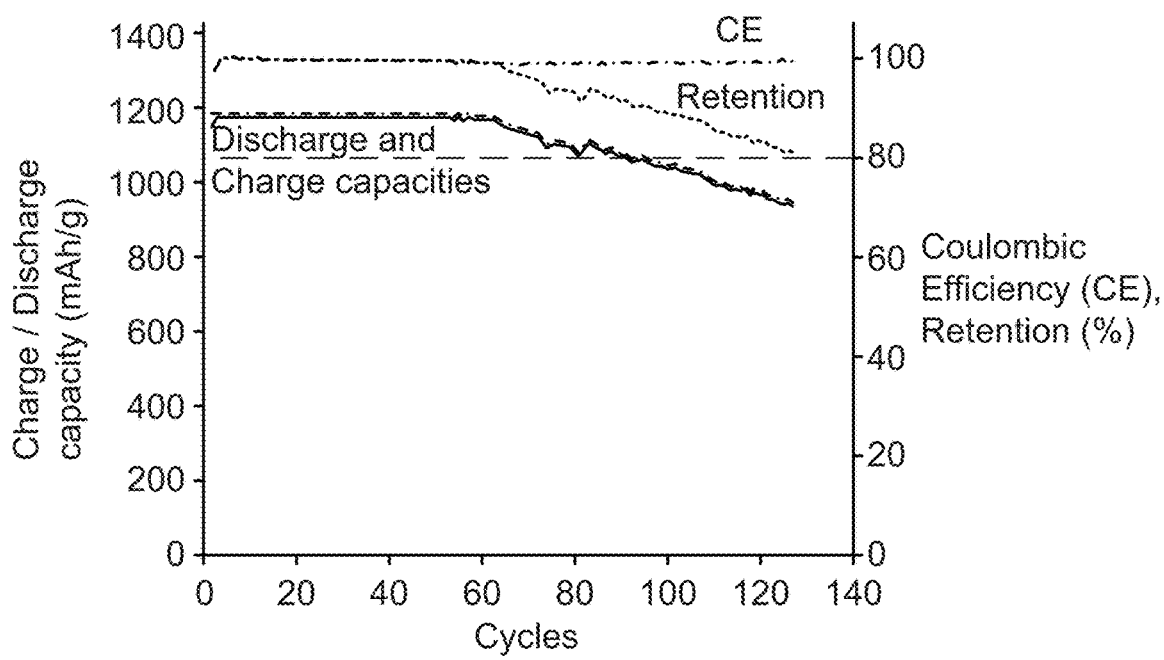
FIGS. 4A and 4B provide a comparison of anode performance for disclosed anode preparation processes, with and without addition of Sn NP, respectively, according to some embodiments of the invention.
Figure 4B:
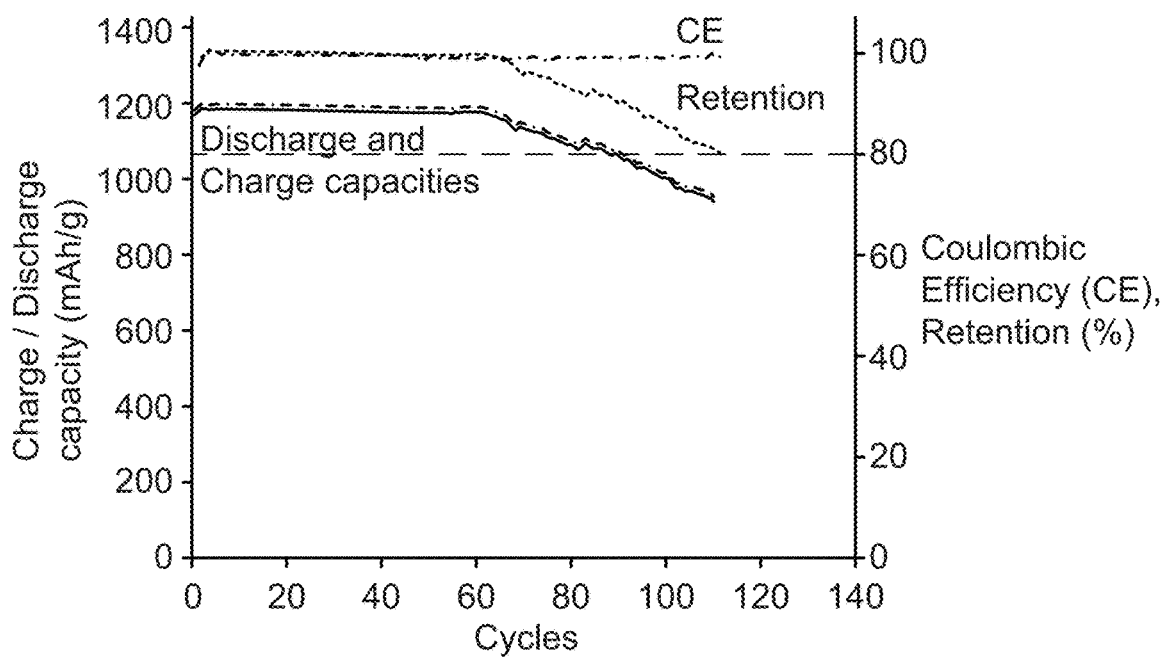

FIGS. 4A and 4B provide a comparison of anode performance for disclosed anode preparation processes, with and without addition of Sn NP, respectively, according to some embodiments of the invention. FIG. 4A illustrates results for coin cells with anodes 131 prepared from passivated silicon-based active material particles 125 (using a water-based slurry), and FIG. 4B illustrates results for similar coin cells with passivated anodes 131, which however lack the addition of Sn NP, and using a water-based slurry. The inventors note that both cases provide scalable processes of working with silicon, whereas addition of Sn also increases the cycling lifetime and performance. FIGS. 4A and 4B illustrate that the disclosed passivation of the silicon particles enables using water-based slurries in preparing the anodes, without reduction in performance. It is noted that non-reactivity in a water-based slurry is an enabling property for upscaling lithium-ion battery production.

Figure 4C:
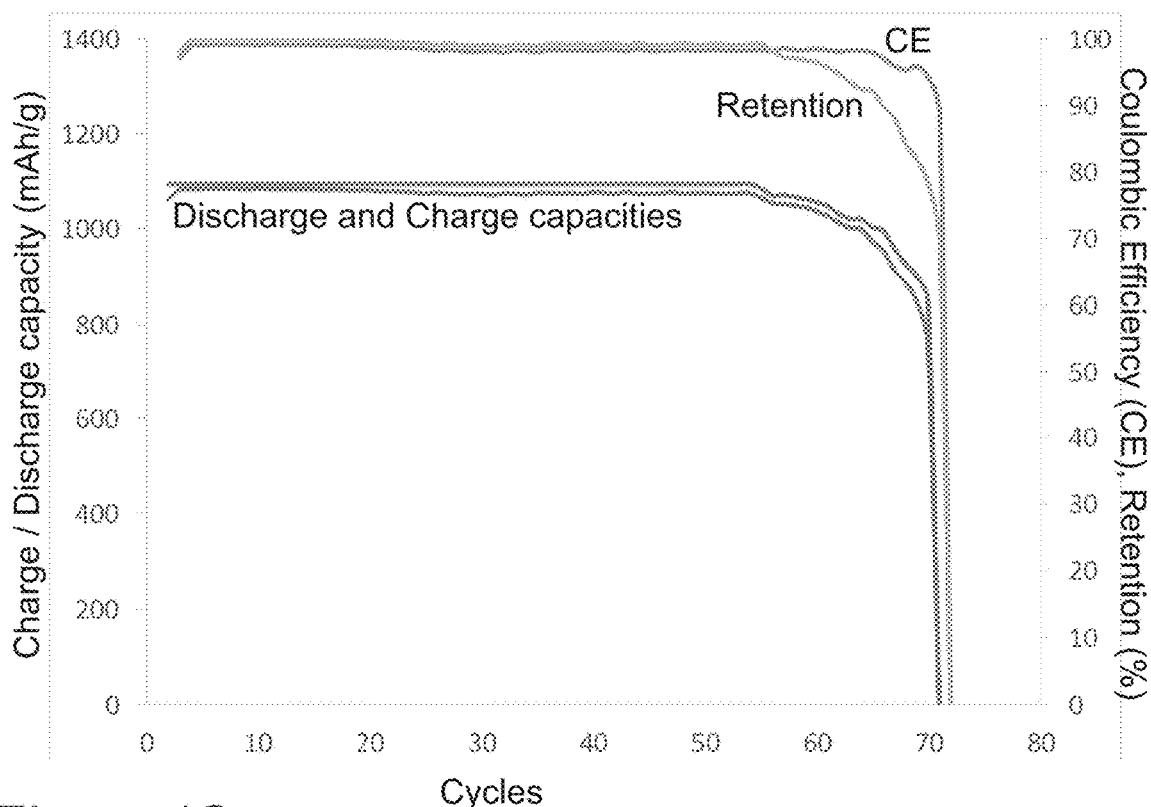
FIGS. 4C and 4D provide data of anode performance for disclosed anode preparation processes, with $SbCl_2$ and $CuCl_2$, respectively, as metalloid salt NPs in half cell configurations, according to some embodiments of the invention.
Figure 4D:
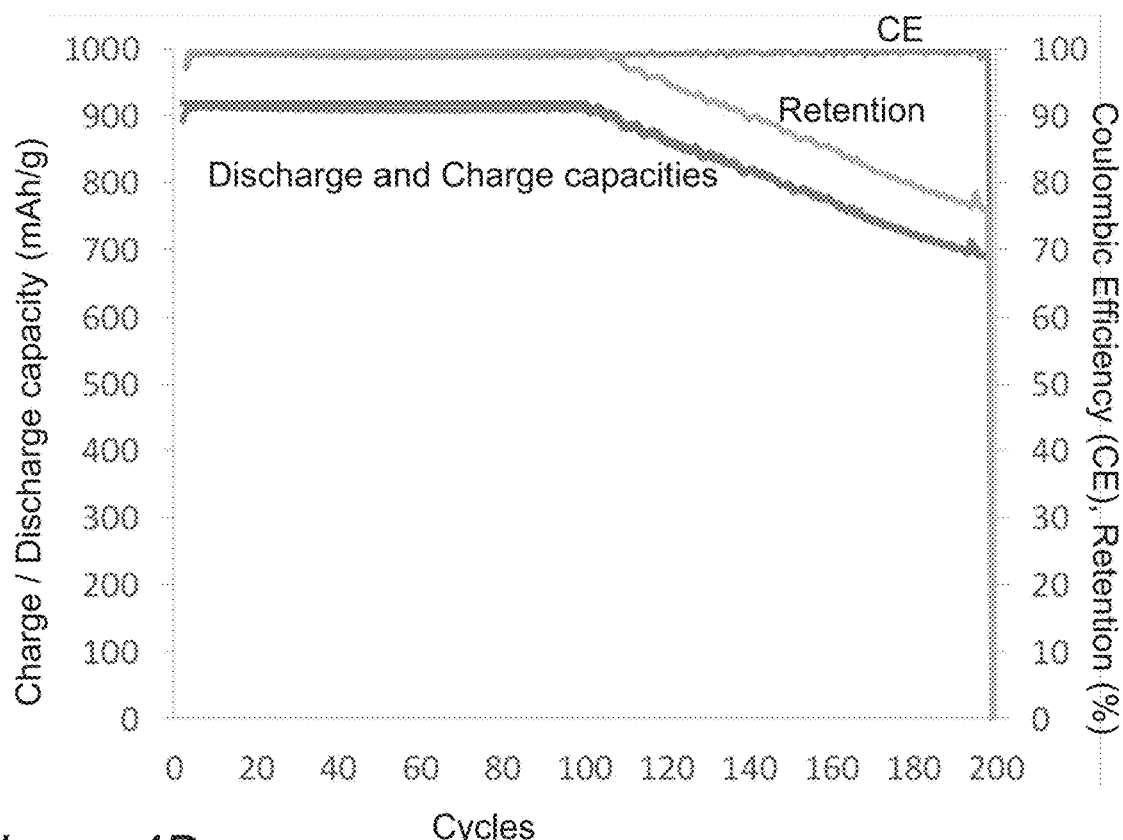

FIGS. 4C and 4D provide data of anode performance for disclosed anode preparation processes, with $SbCl_2$ and $CuCl_2$, respectively, as metalloid salt NPs 95A in half cell configurations, according to some embodiments of the invention. The cells were prepared as coin cells and the charging rate was 1C. The retention was measured from the forth cycle (following formation). FIGS. 4C and 4D illustrate the possibility of using $SbCl_2$ and $CuCl_2$ as metalloid salt NPs 95A, as disclosed herein.

Figure 4E:
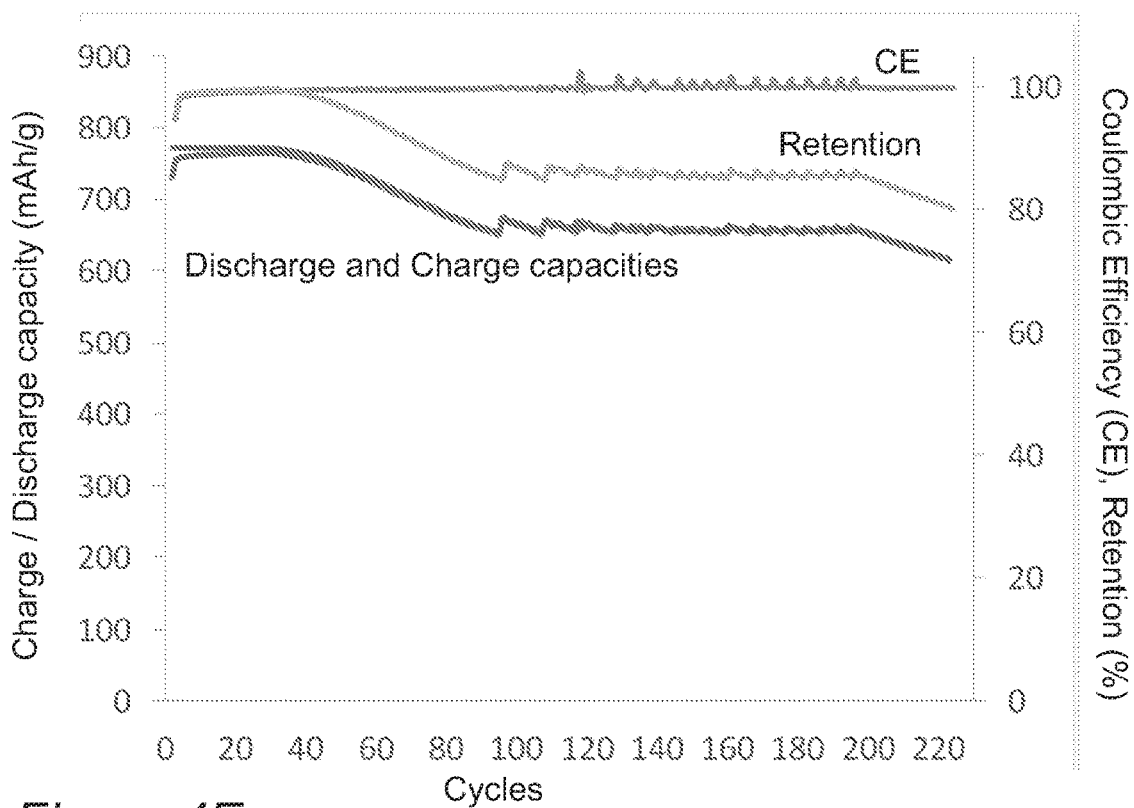
FIGS. 4E and 4F provide data of anode performance for disclosed anode preparation processes, with $SnCl_2$ and $CuCl_2$, respectively, as metalloid salt NPs in full cell configurations, according to some embodiments of the invention.
Figure 4F:
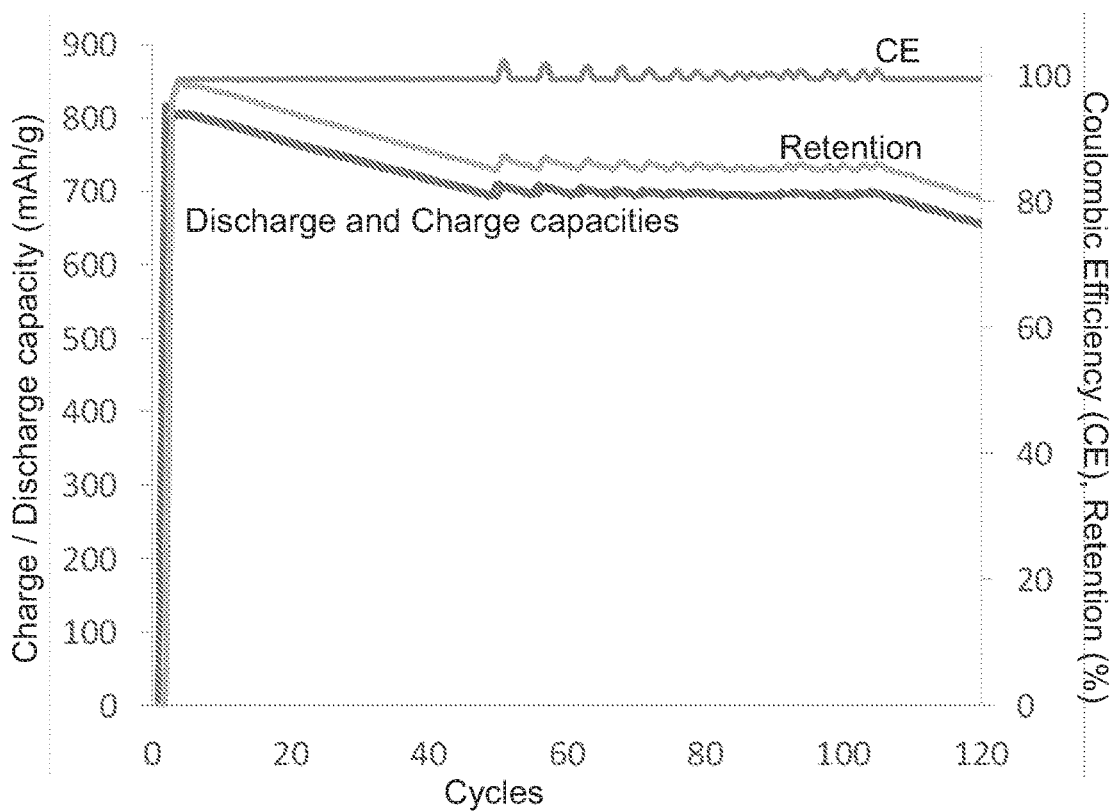

FIGS. 4E and 4F provide data of anode performance for disclosed anode preparation processes, with $SnCl_2$ and $CuCl_2$, respectively, as metalloid salt NPs 95A in full cell configurations, according to some embodiments of the invention. The cathodes in the full cells were NMC cathodes (based on a lithium nickel-manganese-cobalt formulation), and the charging rate was 6C. The retention was measured from 2.53 mAh for $SnCl_2$ and from 2.19 mAh for $CuCl_2$. FIGS. 4E and 4F illustrate the possibility of using $SnCl_2$ and $CuCl_2$ as metalloid salt NPs 95A, as disclosed herein—in full cell configurations and in high charging rate applications.

Figure 5A:
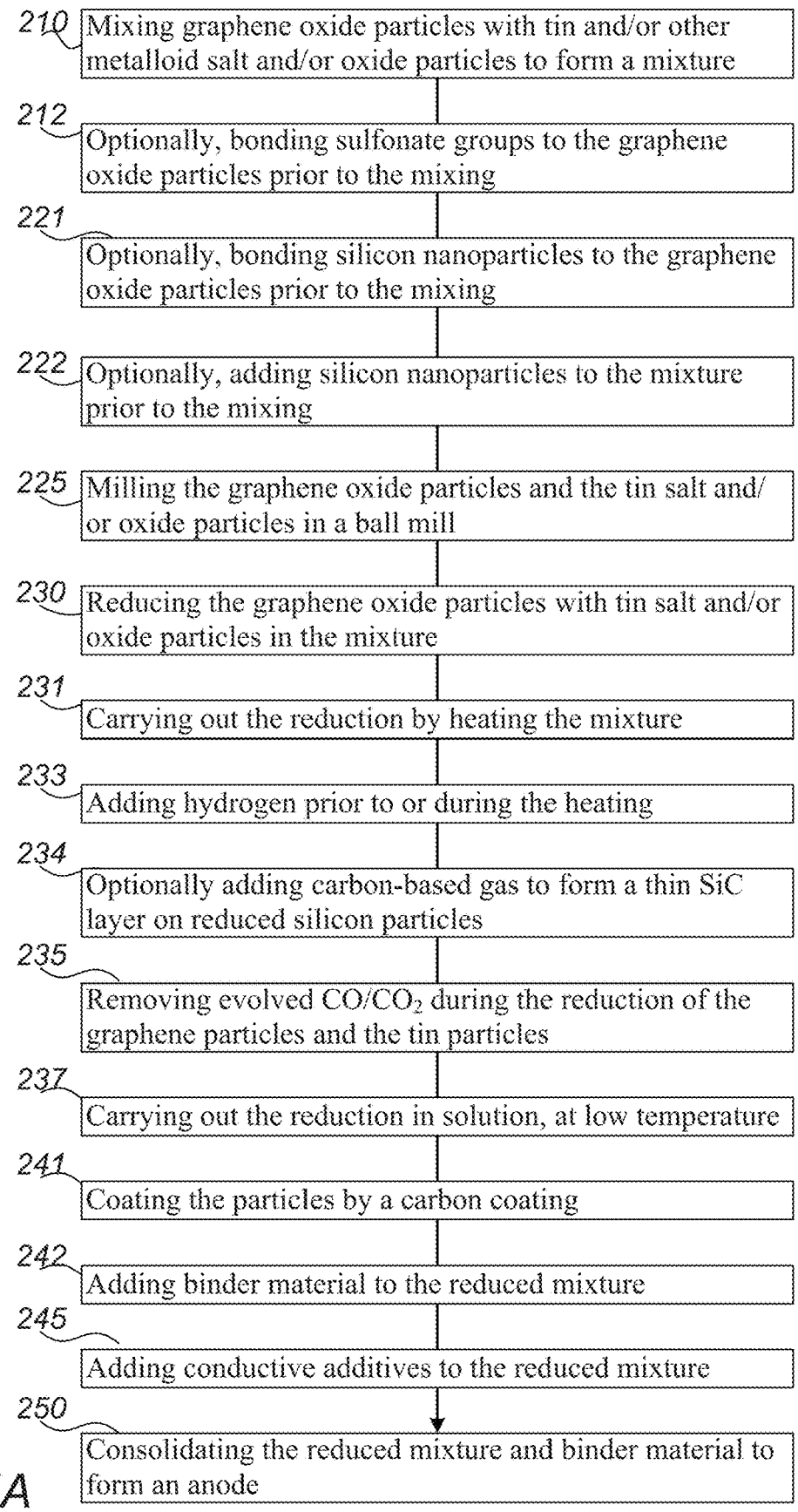
FIG. 5A is a high-level flowchart illustrating a method of preparing an anode for a Li-ion battery, according to some embodiments of the invention.

FIG. 5A is a high-level flowchart illustrating a method 200 of preparing an anode for a Li-ion battery, according to some embodiments of the invention. The stages of method 200 may be carried out in combination with any of the stages of method 100, to enhance or complement the formation of anodes 131 described above. Method 200 may comprise the following stages, irrespective of their order.

As illustrated schematically in FIG. 5A, method 200 may comprise mixing graphene oxide particles and/or other carbon matrix with tin salt and/or oxide particles (e.g., $SnCl_2$, SnO, $SnO_2$ etc.), and/or other metalloid salt and/or oxide particles—to form a mixture (stage 210), for example, the metalloid, e.g., tin salt and/or oxide particles may provide 0.1%-30% (w/w) of the mixture; reducing the graphene oxide particles and the tin salt and/or oxide particles in the mixture (stage 230) (e.g., deoxidizing graphene oxide and possibly tin oxide), e.g., by heating the mixture at a temperature in a range of 200 to 900° C., or possibly at a temperature in a range of 400 to 700° C., to form a reduced mixture (e.g., enhancing or complementing reduced mixture 121); alternatively or complementarily reducing the mixture in solution at low temperatures); adding a binder material to the reduced mixture (stage 242); and consolidating the reduced mixture and binder material to form the anode (stage 250).

In various embodiments, the metalloid particles added to the graphene may comprise at least one of: metalloid oxide particles, metalloid salts and metalloid nanocrystals, wherein the metalloid comprises at least one of Sn, Ge and Si.

In certain embodiments, graphene oxide particles may be added to mixture 111 disclosed above to enhance its carbon content, e.g., in place or in addition to carbon black NPs 95C. The tin salt and/or oxide particles may correspondingly be used to complement or at least partly replace salt NPs 95B to enhance the capacity of formed anodes 131.

In some embodiments, method 200 may further comprise bonding sulfonate groups to the graphene particles (stage 212) prior to mixing 210. In some embodiments, method 200 may further comprise bonding silicon nanoparticles to the graphene particles (stage 221) prior to mixing 210, and/or incorporating any of the stages of method 100 disclosed above. In certain embodiments, method 200 may comprise adding silicon nanoparticles to the mixture (stage 222) prior to mixing 210.

In some embodiments, mixing 210 may comprise milling the graphene oxide particles and the tin salt and/or oxide particles in a ball mill (stage 225). In some embodiments, reducing 230 may be carried out in a stainless-steel container holding the mixture during reduction 230 of the graphene oxide particles and the tin salt and/or oxide particles.

In some embodiments, reducing 230 may be carried out by heating the mixture (stage 231), e.g., above 200° C., 400° C., 600° C., 800° C., optionally up to 1000° C., e.g., in an inert atmosphere. In some embodiments, reducing 230 may further comprise adding hydrogen to the inert atmosphere prior to or during the heating (stage 233) and/or optionally adding carbon-based gas to form a thin SiC layer on reduced silicon particles (stage 234). In some embodiments, method 200 may further comprise removing evolved CO and/or $CO_2$ from the container during the reduction of the graphene oxide particles and the tin salt and/or oxide particles (stage 235).

In some embodiments, reducing 230 may be carried out in solution, at low temperatures, e.g., in reducing solution, e.g., comprising sodium borohydride at temperatures below 200° C.

In some embodiments, method 200 may further comprise coating the reduced particles with a carbon coating (stage 241). In some embodiments, method 200 may further comprise adding conductive additives to the reduced mixture (stage 245). Method 200 may comprise preparing the anode from active material particles slurry and additives and preparing corresponding lithium ion cells and batteries from the anode(s), cathode(s), electrolyte(s), separator(s) and corresponding enclosure, contacts and current collectors, control circuits and other cell and battery elements.

Figure 5B:
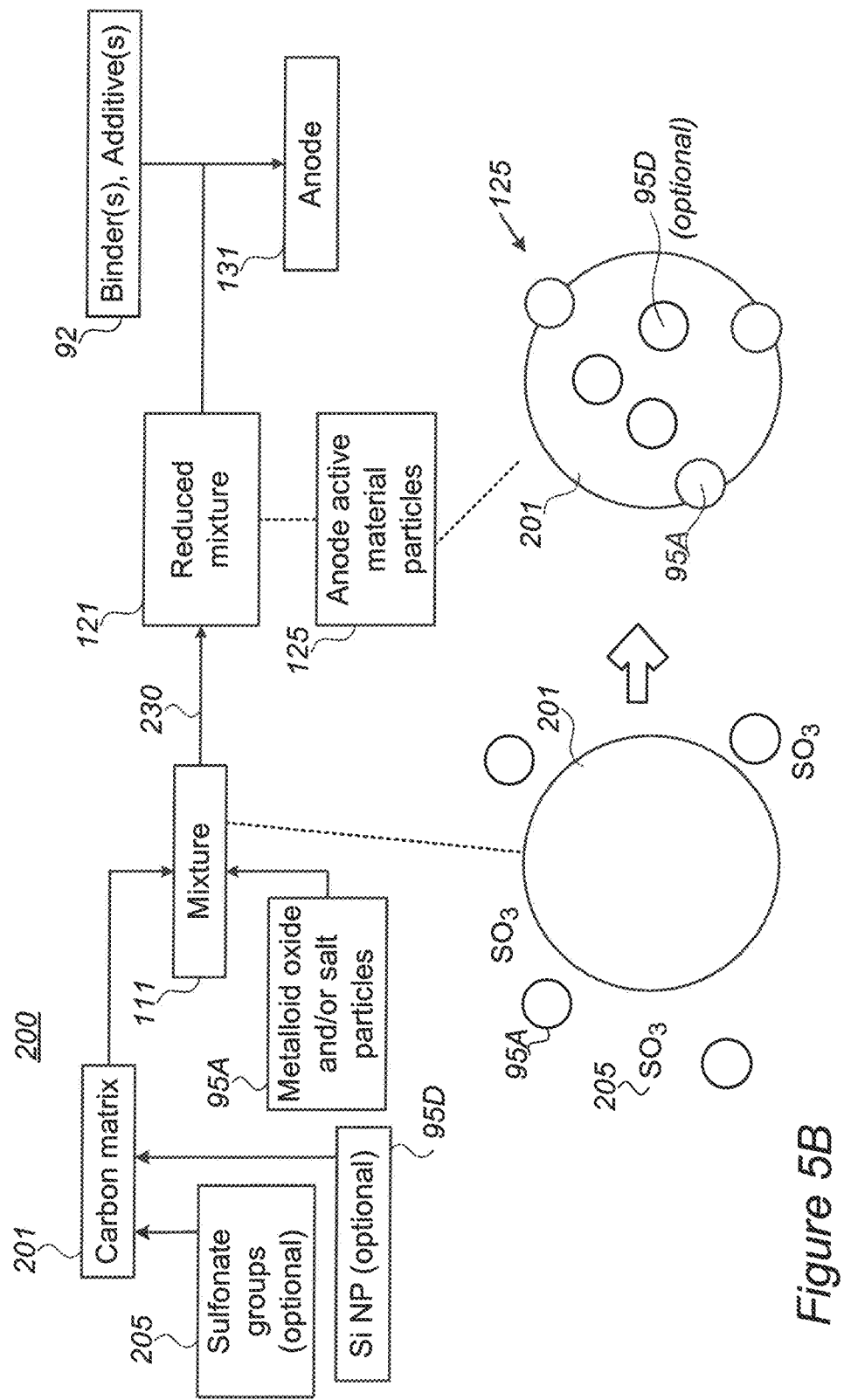
FIG. 5B is a high-level schematic illustration of anode preparation methods and production steps using carbon-based anode active material, according to some embodiments of the invention.

FIG. 5B is a high-level schematic illustration of anode preparation methods and production steps 200 using carbon-based anode active material 201, according to some embodiments of the invention. In certain embodiments, methods 200 comprise preparing anodes 31 for lithium-ion batteries by mixing (stage 210) a carbon matrix 201 with metalloid oxide and/or salt particles 95A to form a mixture 111, reducing (stage 230) mixture 111 to yield reduced mixture 121, adding at least binder material 92 to reduced mixture 121, and consolidating (stage 250) reduced mixture 121 with at least binder material 92 to form anode 131.

In certain embodiments, metalloid oxide and/or salt particles 95A may comprise metalloid oxide particles of at least one of Si, Ge and Sn; and/or salt particles of at least one of Si, Ge and Sn. For example, metalloid oxide and/or salt particles 95A may comprise tin oxide particles and/or tin salt particles, e.g., SnO, $SnO_2$ and/or $SnCl_2$ particles, respectively. For example, tin salt and/or oxide particles may provide 0.1%-30% (w/w) of mixture 111. Reducing 230 of mixture 11 respectively comprises reducing metalloid oxide and/or salt particles 95A in mixture 111.

In certain embodiments, carbon matrix 201 may comprise at least one of graphene oxide particles, hard carbon particles, graphite flakes and/or carbon black nanoparticles. For example, carbon matrix 201 may comprise graphene oxide particles 201 and reducing 230 of mixture 111 may comprise reducing the graphene oxide particles, e.g., by heating mixture 111 at a temperature in a range of 200° C. to 900° C. and in an inert or hydrogen rich atmosphere and/or by heating mixture 111 at a temperature in a range of 400° C.

to 700° C. and in a hydrogen rich atmosphere. Alternatively or complementarily, reducing 230 may be carried out in a reducing solution mixture, e.g., sodium borohydride, at a temperature below 200° C. It is noted that carbon matrix 201 may participate in reduction 230 and/or act as the reducing agent, e.g., upon heating metalloid oxide and/or salt particles 95A such as tin salt in an inert atmosphere. Reduction 230 may be carried out e.g., by heating in an appropriate atmosphere (e.g., inert atmosphere with additional hydrogen), and/or at low temperatures in solution (e.g., a reducing solution comprising sodium borohydride).

In certain embodiments, mixing 210 may comprise milling carbon matrix 201 and Metalloid oxide and/or salt particles 95A such as the tin salt and/or oxide particles in a ball mill. Reduction 230 may be carried out in a stainless-steel container and evolving gases such as CO and/or $CO_2$ may be removed from the container during reduction 230 of mixture 111. In certain embodiments, method 200 may comprise bonding sulfonate groups 205 to carbon matrix 201 prior to mixing 210. For example, in case carbon matrix 201 comprises graphene oxide particles, the sulfonate groups may be bound to the graphene oxide particles. In certain embodiments, method 200 may comprise bonding silicon nanoparticles (Si NP) 95D to carbon matrix 201 prior to mixing 210. For example, in case carbon matrix 201 comprises graphene oxide particles, silicon nanoparticles 95D may be bonded to the graphene oxide particles.

Certain embodiments comprise anode(s) 131 for fast charging lithium ion batteries that are prepared by method 200. Anode(s) 131 may comprise reduced mixture 121 of carbon matrix 201 (comprising e.g., graphene oxide particles, hard carbon particles, graphite flakes and/or carbon black nanoparticles) with metalloid oxide and/or salt particles 95A (comprising e.g., SnO, $SnO_2$ and/or $SnCl_2$ particles, respectively), consolidated (e.g., with binder(s) and/or additive(s) 92) to form anode(s) 131. Sn-decorated graphene active material particles 125 may comprise reduced graphene with bonded reduced tin nanoparticles. The reduced graphene particles may be, e.g., 100-500 nm in diameter and the bonded reduced tin nanoparticles may be, e.g., 10-15 nm in diameter. Anode active material particles 125 may further comprise bonded silicon nanoparticles. In certain embodiments, sulfonate ($SO_3$) groups 205 may be used to attach the tin oxide and graphene oxide particles. In some embodiments, the reduced graphene-tin particles (with or without silicon) may be further coated with a carbon coating. Tin nanoparticles 95A may provide 0.1%-30% (w/w) of anode active material particles 125, and/or tin oxide nanoparticles 95A may provide 0.1%-30% (w/w) of the mixture thereof with graphene oxide particles 201.

In various embodiments, lithium ion batteries may be prepared from disclosed anodes 131, possibly having a range of metalloid-based anode materials, e.g., as disclosed in U.S. Patent Publication No. 2017/0294687, incorporated herein by reference in its entirety. For example, the battery cells may have passivated anode active material that comprises silicon, at least as main component, and overall being metalloid-based (e.g., having >80% metalloids such as Si, Ge and Sn), in contrast to prior art cells that may have anode active material that mainly comprises graphite (e.g., >80% graphite) and may be decorated with metalloids (e.g., at <20 wt %). Disclosed lithium ion batteries (and/or respective battery cells thereof) may at least partly be configured, e.g., by selection of materials, to enable operation at high charging and/or discharging rates (C-rate), ranging from 3-10 C-rate, 10-100 C-rate or even above 100C, e.g., 5C, 10C, 15C, 30C or more. It is noted that the term C-rate is a measure of charging and/or discharging of cell/battery capacity, e.g., with 1C denoting charging and/or discharging the cell in an hour, and XC (e.g., 5C, 10C, 50C etc.) denoting charging and/or discharging the cell in 1/X of an hour—with respect to a given capacity of the cell.

Lithium ion batteries typically comprise anodes and cathodes with current collectors affixed thereto, packed with electrolyte and separator(s) in a battery pouch. Anodes are typically made of anode material particles, conductive additive(s) and binder(s), and may comprise any of the anode configurations taught, e.g., by U.S. Patent Publication No. 2017/0294687, incorporated herein by reference in its entirety. For example, anodes may be based on graphite, graphene or metalloid anode material such as Si, Ge, Sn and their combinations. Cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) LFP formulations (based on $LiFePO_4$), lithium rich cathodes, and/or combinations thereof. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films thereof, woven or non-woven fabrics etc. may be used as separator(s), as well as possibly composite materials including, e.g., alumina, zirconia, titania, magnesia, silica and calcium carbonate along with various polymer components as listed above.

In any of the disclosed embodiments, electrolytes may be based on liquid electrolytes, typically linear and cyclic carbonates, such as ethylene carbonate, diethyl carbonate, propylene carbonate, VC (vinylene carbonate), FEC (fluoroethylene carbonate), EA (ethyl acetate), EMC (ethyl methyl carbonate), DMC (dimethyl carbonate) and combinations thereof and/or solid electrolytes such as polymeric electrolytes such as polyethylene oxide, fluorine-containing polymers and copolymers (e.g., polytetrafluoroethylene), and combinations thereof. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. patent application Ser. No. 16/243,190, incorporated herein by reference in its entirety.

It is noted that the given values may be modified by ±10% of the respective value.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
    forming a mixture of silicon particles with nanoparticles (NPs) and a carbon-based binder and/or surfactant, wherein the NPs comprise copper salt NPs and tin salt NPs, wherein the NPs provide nucleation sites for forming a passivation layer coating on the silicon particles;
    reducing the mixture to yield a reduced mixture comprising coated silicon particles having the passivation layer coating, and
    consolidating the reduced mixture to form an anode.

2. The method of claim 1, further comprising using the reduced mixture in a water-based slurry to form the anode, wherein the passivation layer coating of the coated silicon particles inhibits reactions of the silicon particles in the water-based slurry.

3. The method of claim 1, wherein the carbon-based binder and/or surfactant comprises PEDOT-PSS (poly(3,4-ethylene dioxythiophene).

4. The method of claim 1, wherein the NPs provide 0.1%-30% (w/w) of the mixture.

5. The method of claim 1, wherein the carbon-based binder and/or surfactant comprises at least one of: PVP (polyvinylpyrrolidone), PAA (poly(acrylic acid)), Li-PAA, PVDF (polyvinylidene difluoride), CMC (carboxymethyl cellulose), polypyrrole, PEDOT-PSS (poly(3,4-ethylene dioxythiophene): poly(styrene sulfonate)), polyaniline, polyethylene oxide, polyvinyl acetate, polyvinyl alcohol, citric acid/citrate salt, cetrimonium bromide, and their respective derivatives and/or combinations.

6. The method of claim 1, wherein the reducing is carried out by heating the mixture at a temperature in a range of 700° C. to 1000° C.

7. The method of claim 1, wherein the reducing is carried out in presence of an inert gas.

8. The method of claim 1, wherein the reducing is carried out in solution with a reducing agent.

9. The method according to claim 8 wherein the reducing agent is sodium borohydride.

10. The method according to claim 8 wherein the reducing is executed at a temperature below 200° C.

11. The method of claim 1, wherein the passivation layer coating of the coated silicon particles is 5-20 nm thick.

12. The method of claim 1, wherein the passivation layer coating of the coated silicon particles comprises a 0.1-3 nm thick SiC layer.

13. The method of claim 1, wherein the reducing is configured to form the passivation layer coating as an amorphous coating on the silicon particles.

14. The method according to claim 1 comprising adding graphene oxide particles to the mixture.

15. The method according to claim 14 comprising bonding sulfonate groups to the graphene oxide particles prior to a mixing included in the forming of the mixture.

16. The method according to claim 14 comprising bonding silicon nanoparticles to the graphene oxide particles.

17. The method according to claim 14 comprising removing at least one of evolved CO and evolved $CO_2$ from a container during a reduction of the graphene oxide particles.

18. The method according to claim 14 wherein the graphene oxide particles are included in a carbon matrix; wherein the carbon matrix acts as a reducing agent during the reducing.

19. The method according to claim 18 wherein the carbon matrix further comprises hard carbon particles, graphite flakes and carbon black nanoparticles.

20. The method according to claim 1 wherein the reducing is carried out in a tube furnace, and the reducing comprises removing evolving gases such as at least one of CO and $CO_2$ during the reducing.

21. The method according to claim 1 comprising the passivation layer coating of the coated silicon particles at temperatures of 700° C.

22. The method according to claim 1 wherein the forming of the mixture comprises utilizing a magnetic stirrer.

23. The method of claim 1, wherein the carbon-based binder and/or surfactant comprises PVP (polyvinylpyrrolidone), Li-PAA, polypyrrole, and PEDOT-PSS (poly(3,4-ethylene dioxythiophene): poly(styrene sulfonate)).

24. The method of claim 1, wherein the carbon-based binder and/or surfactant comprises citric acid and cetrimonium bromide.

25. The method according to claim 1 wherein the reducing is configured to form the passivation layer coating to comprise lithium titanate.

* * * * *